US006955754B2

(12) United States Patent
de Sylva

(10) Patent No.: US 6,955,754 B2
(45) **Date of Patent: *Oct. 18, 2005**

(54) COMPACT FLUID CLEANING SYSTEM

(76) Inventor: Robert de Sylva, 161 Ocean Park Blvd. #D, Santa Monica, CA (US) 90405

(*) Notice: Subject to any disclaimer, the term of this patent is extended or adjusted under 35 U.S.C. 154(b) by 161 days.

This patent is subject to a terminal disclaimer.

(21) Appl. No.: 09/942,304

(22) Filed: Aug. 30, 2001

(65) Prior Publication Data

US 2002/0046965 A1 Apr. 25, 2002

Related U.S. Application Data

(63) Continuation-in-part of application No. 08/826,727, filed on Apr. 7, 1997, now Pat. No. 6,368,497.

(51) Int. Cl.[7] .............................................. B01D 35/01

(52) U.S. Cl. ....................... 210/120; 210/180; 210/184; 210/436; 210/440; 210/457; 210/472; 159/13.2; 219/629; 196/46.1; 196/110; 196/121; 196/128; 196/136

(58) Field of Search ................................ 210/180, 183, 210/184, 185, 223, 436, 457, 472, 120, 440; 159/13.1, 13.2, 13.3, 14, 15, DIG. 28; 219/629, 630; 196/46, 46.1, 110, 121, 128, 136

(56) References Cited

U.S. PATENT DOCUMENTS

| | | | | | |
|---|---|---|---|---|---|
| 2,133,359 | A | * | 10/1938 | Miller | 196/128 |
| 2,173,631 | A | * | 9/1939 | Niedens | 196/46.1 |
| 2,186,669 | A | * | 1/1940 | Fawcett et al. | 202/205 |
| 2,392,901 | A | * | 1/1946 | Brown | 210/416.5 |
| 2,428,939 | A | * | 10/1947 | Morris | 210/185 |
| 2,983,384 | A | * | 5/1961 | Winslow | 210/132 |
| 3,334,753 | A | * | 8/1967 | Matravers | 210/457 |
| 3,915,860 | A | * | 10/1975 | Priest | 210/136 |
| 4,151,823 | A | * | 5/1979 | Grosse et al. | 123/196 A |
| 4,218,320 | A | * | 8/1980 | Liaw | 210/223 |
| 4,227,969 | A | * | 10/1980 | Engel | 196/115 |
| 4,337,119 | A | * | 6/1982 | Donahue | 196/46 |
| 4,943,352 | A | * | 7/1990 | Lefebvre et al. | 196/46.1 |
| 5,322,596 | A | * | 6/1994 | Arntz | 196/46.1 |
| 5,569,373 | A | * | 10/1996 | Smith et al. | 210/90 |
| 5,617,737 | A | * | 4/1997 | Christensen et al. | 62/487 |
| 5,776,315 | A | * | 7/1998 | Lowry | 196/46.1 |
| 5,824,211 | A | * | 10/1998 | Lowry | 210/92 |
| 6,368,497 | B1 | * | 4/2002 | de Sylva | 210/120 |

* cited by examiner

*Primary Examiner*—Matthew O. Savage

(57) ABSTRACT

An efficient fluid cleaning system. The efficient system includes a first mechanism for changing the pressure of a fluid from a first pressure to a second pressure, the second pressure being lower than the first pressure. A second mechanism distributes the fluid within an evaporation chamber at the second pressure. The evaporation chamber includes an evaporation surface having capillary channels for dispersing oil about the evaporation surface via capillary action to facilitate evaporation of contaminants from within the fluid. In a specific embodiment, the capillary channels are spiral capillary channels, and the system further includes a vent through a ceiling of the evaporation chamber. The vent includes a valve biased in an open position and lacking a cracking pressure. The valve prevents the escape of the fluid from the system but allows gases to escape from the system unencumbered. The evaporation surface has perforations through which fluid passes onto the evaporation surface. The perforations are selectively distributed about the evaporation surface to facilitate oil dispersion about the surface to maximize exposed surface area.

17 Claims, 7 Drawing Sheets

COMPACT FLUID CLEANING SYSTEM

This is a continuation-in-part of U.S. patent application Ser. No. 08/826,727, filed Apr. 7, 1997, now U.S. Pat. No. 6,368,497.

BACKGROUND OF THE INVENTION

1. Field of Invention

This invention relates to fluid cleaning systems. Specifically, the present invention relates to devices for cleaning or recycling fluid, such as engine oil.

2. Description of the Related Art

Oil is a lubricant in a variety of applications ranging from electric generators to printing presses to automobiles. Such applications require clean oil with minimal liquid, gas, and solid contaminants.

Typical engine oil contains a variety of solid, gas, and liquid contaminants. Engine oil is contaminated by gases from engine cylinder blow-by, by solids from engine component wear, and by liquids from coolant leaks and condensed blow-by gas. Liquids combine with sulfur and other compounds from cylinder blow-by, creating corrosive acids, such as sulfuric acid. These contaminants corrode engine parts and deplete special minerals and detergents added to help maintain important oil properties, including lubricity and viscosity.

To reduce problems associated with oil contamination, full-flow filters were developed. All oil circulating around an engine equipped with a full-flow filter is directed through the filter or filter housing. High flow requirements limit the ability of conventional full-flow filters to remove very small solid contaminants. Large particles of twenty microns or larger often pass through such filters and contribute to engine wear. In addition, conventional full-flow filters are ineffective at removing liquid and gaseous contaminants from the oil.

To remove both solid and liquid contaminants from engine oil, mobile, i.e., on-board oil refining systems were developed. The systems continually remove, clean, and replace small amounts of oil from the engine as the engine operates. The systems include a special evaporation compartment that attaches to a by-pass filter. The evaporation compartment attempts to remove both gaseous and liquid contaminants from the oil, and the filter removes solid contaminants as small as one micron in diameter. Such small particles are often smaller than engine tolerances and do not contribute to engine wear. These oil-refining systems may obviate the need for interval oil changes but require interval filter changes.

The systems require a large evaporation compartment and an expensive electric heating element or an engine exhaust heater. The heating element or exhaust heater increases the risk of the systems exploding due to gas ignition. To reduce explosion danger, the evaporation compartments are constructed of strong, thick, and heavy metal, yielding expensive and bulky evaporation compartments.

The large size of the systems limits installation to large trucks and automobiles with ample space. Installation on most modern automobiles is difficult and expensive due to limited space. In addition, the electrical connections or exhaust gas conduits required for the electric heating elements or exhaust heaters, respectively, complicate installation and decrease the reliability of the systems. Public acceptance of the systems has been minimal because of these problems.

A newer system, lacking a heating element, is disclosed in U.S. Pat. No. 5,824,211 to Lowry. Unfortunately, the system disclosed in Lowry has several disadvantages. In particular, Lowry discloses a system having a tubular evaporation surface surrounded by a filter. Oil passes through the filter and onto the surface at several linearly distributed holes near the top of the surface. Lowry surmises that by placing holes at the top of the surface only, oil will have a further travel distance down the evaporation surface, thereby evaporating more volatile contaminants from the oil. This however, does not work as anticipated by Lowry, since the overall rate of evaporation of contaminants from the oil is based on the surface area of the exposed contaminated oil and not the travel distance of a particular portion of the oil. The linearly distributed holes promote channeling when the system is slightly tilted. Channeling of the fluid as it flows down the evaporation surface significantly reduces effective evaporation surface area. Furthermore, Lowry includes a vent, an oil drain, and an oil sample bore in a confined space at the bottom of the evaporation chamber. By positioning the vent in the bottom of the evaporation chamber, any contaminant gases in the evaporation chamber must overcome the buoyancy force of the vapors, which cause the vapors to rise, to evacuate out the vent. This requires significant vapor pressure, which is often not present due to the lack of a heater element. Furthermore, positioning the vent in the bottom of the evaporation chamber next to the oil drain forces undesirable space constraints on the size of the vent and the size of the oil drain. This necessitates a relatively narrow, restrictive vent, which further inhibits volatile contaminant circulation out of the system. The size of the drain is also compromised. This increases the likelihood of oil backing up in the system, covering the evaporation surface (thereby rendering it further ineffective) and flowing out the vent, which lacks a check valve. The design of the vent is also undesirable, as it includes a bend that further restricts the flow of gaseous contaminants from the system.

Hence, a need exists in the art for a safe, space-efficient and cost-effective mobile fluid recycling system that efficiently and effectively removes both solid and liquid contaminants from fluid, such as oil, without requiring a heater element. There is a further need for a system that may be easily installed on modern automobiles, which maximizes gaseous contaminant circulation out of the system.

SUMMARY OF THE INVENTION

The need in the art is addressed by the efficient fluid cleaning system of the present invention. In the illustrative embodiment, the inventive system is adapted for use with automobile combustion engines. The efficient system includes a first mechanism for changing the pressure of a fluid, such as oil, from a first pressure to a second pressure, the second pressure being lower than the first pressure. A second mechanism distributes the fluid within an evaporation chamber at the second pressure. The evaporation chamber includes an evaporation surface having capillary channels for dispersing fluid about the evaporation surface via capillary action to facilitate evaporation of contaminants from within the fluid.

In a more specific embodiment, the capillary channels are spiral capillary channels. The system further includes a vent that vents the contaminants through a ceiling of the evaporation chamber. Clean fluid is provided in response thereto. The vent includes a valve biased in an open position and lacking a cracking pressure. The valve prevents the escape of the fluid from the system but allows gases to escape from the system unencumbered. The evaporation surface includes perforations through which fluid passes onto the evaporation surface. The perforations are distributed in at least two dimensions relative to the evaporation surface to facilitate fluid dispersion about the surface to maximize exposed surface area.

The specific embodiment further includes a housing with a filter disposed therein. The filter surrounds the evaporation chamber. The filter is disposed within the housing, forming a space between the filter and the housing, wherein the fluid can circulate. A fourth mechanism drains the clean fluid from the evaporation chamber via a drain extending through a base of the evaporation chamber. The drain is an only aperture extending from the base of the evaporation chamber.

The capillary channels are partially circular and are sufficiently deep to distribute fluid about a circumference of the evaporation surface when the fluid cleaning system and the evaporation chamber are in a near horizontal position. A mesh is positioned within the evaporation chamber to further expand effective evaporation surface area. Another mechanism squirts the fluid within the evaporation chamber to enhance effective evaporation surface area. The squirting causes cavitation of the contaminants, which facilitates the removal of the contaminants from the system.

In an alternative embodiment, an electromagnetic coil is disposed about the evaporation chamber. The electromagnetic coil is an electromagnet for removing metallic contaminants from the fluid. The electromagnetic coil may also act as a heater. Additional channels included in the evaporation surface hold the metallic contaminants when the electromagnetic coil is not powered.

In an illustrative embodiment, the housing includes a spin-on filter canister. The filtering system includes a gradient-density low-micron filter that removes solid contaminants and helps to absorb and neutralize liquid contaminants. The filter is located between the space and the first wall. Strategically located holes in the first wall allow fluid to pass through the filter and onto the evaporation surface. The first wall and the second wall are concentric tubular walls, capped at one end by the base of the housing, and at the other end by an end cap. A washer seals the end cap against the first wall and prevents fluid from seeping between the end cap and the first wall.

The novel design of the present invention is facilitated by the capillary channels, the cavitation jets, and the electromagnetic coil that may act as both a heater and an electromagnet for removing metallic particles from circulation within the fluid. The capillary channels thoroughly distribute fluid, such as engine oil, about the evaporation surface when the evaporation surface is angled away from vertical. The cavitation jets help vaporize certain contaminants within the evaporation chamber and further expand evaporation surface area by creating additional evaporation surfaces on the drops and streams of fluid caused by the cavitation jets.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The following review of the operation of a conventional mobile oil recycling system is intended to facilitate an understanding of the present invention.

Figure 1:
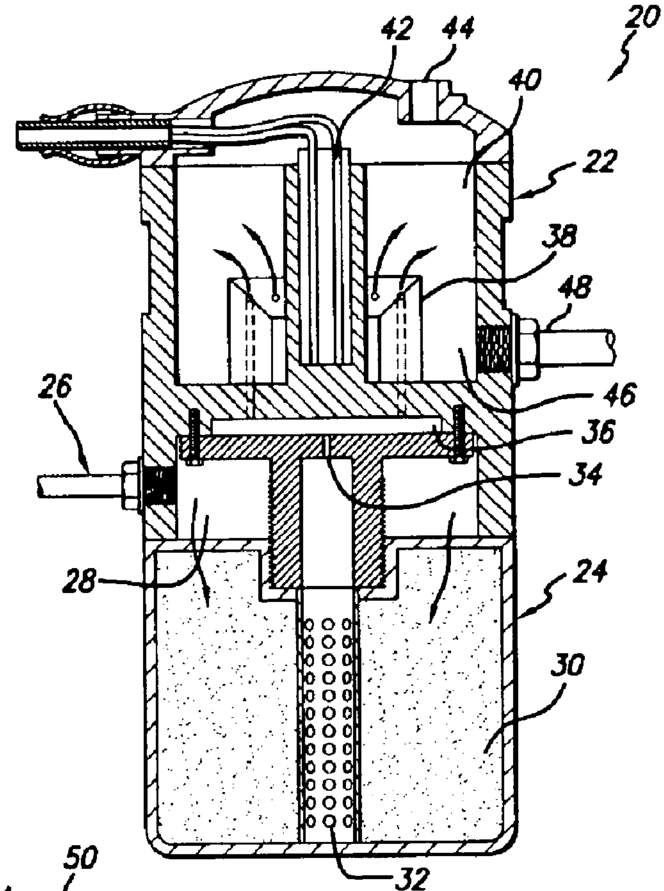
FIG. 1 is a cross-sectional view of a conventional mobile oil recycling system.

FIG. 1 is a cross-sectional view of a conventional mobile oil recycling system 20. The conventional system 20 includes an evaporation unit 22 and a spin-on filter 24. Oil enters the refining system 20 via an oil inlet 26 that is screwed into the side of the evaporation unit 22. The oil inlet 26 carries pressurized oil from an engine (not shown) and deposits the oil in a first hollow space 28 between the filter 24 and the evaporation unit 22. The oil then flows through a filter element 30, which removes certain solid contaminants.

After solid contaminants are removed from the oil via the filter 30, the oil passes into a second hollow space 32. Then, the pressurized oil passes through a metering orifice 34 where the oil pressure changes to atmospheric pressure. The metering orifice 34 restricts the flow of the pressurized oil. Oil passing through the orifice 34 enters a third hollow space 36. From the third hollow space 36, the oil flows through oil channels 38 (shown in phantom) into an evaporation compartment 40. Then, the oil flows across a small, flat evaporation surface 38 in the evaporation compartment 40. The evaporation surface 38 is heated by an electric heating element 42. The heating element 42 is powered by electricity from an engine alternator or battery.

The oil disperses into a thin film over the heated surface 38, which facilitates the evaporation of gas and liquid contaminants from the oil. Evaporated gases and liquids are vented via a vent 44. The vent 44 is typically connected to an engine air intake (not shown), allowing contaminant gases and liquid vapors to be re-burnt in the engine.

Oil coagulates at the bottom of the evaporation compartment 40. Gravity then pulls the oil back to the engine via a gravity-feed oil return 48. Because the oil return 48 exits the side of the system 20 and not the bottom, oil coagulates at a bottom 46 of the evaporation compartment 40. This coagulation minimizes the effective surface area of the heated surface 38 and increases the likelihood that the compartment 50 will back up with oil and overflow out the vent 44.

The first hollow space 28, the second hollow space 32, and the third hollow space 36 all illustrate an inefficient use of space. The large metallic evaporation unit 22 is both heavy and bulky, which complicates installation and increases the cost of the system 20. The system 20 must be mounted using very sturdy metal brackets and screws, which are expensive, bulky, and require a nearly flat mounting surface, which is difficult to find under the hoods of modern automobiles. In addition, the heating element 42 is an expensive, often unreliable and dangerous component. Furthermore, the evaporation surface 38 is small and does not extend to the top of the compartment 40. Consequently, the surface 38 is inefficient and illustrates additional wasted space in the compartment 40.

In a similar oil recycling system (not shown), the oil inlet 26 is placed in the bottom of the filter 24, and the second hollow space 32 is replaced by filter element. In this unit, dirty oil in the filter 24 flows back to the engine causing unwanted fluctuations in oil pressure and oil levels in addition to re-contaminating the engine oil.

Figure 2:
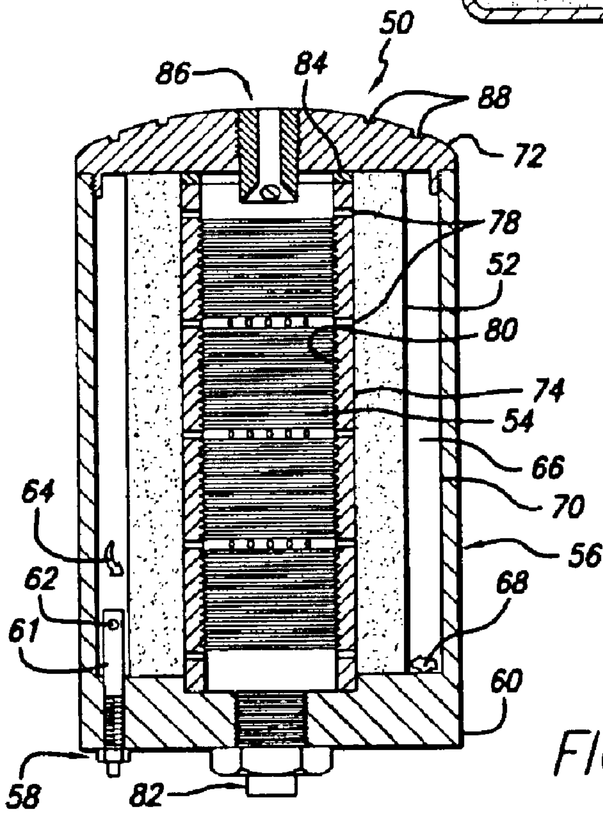
FIG. 2 is cross-sectional view of a mobile oil recycling system constructed in accordance with the teachings of the present invention.

FIG. 2 is cross-sectional view of a mobile oil recycling system 50 constructed in accordance with the teachings of the present invention. The system 50 includes a cylindrical liquid and gas removal chamber 54 surrounded by a low-micron, gradient-density filter 52 that is contained in a system housing 56. The filter 52 may be ordered from a filter supply house such as Harrington Industrial Plastics. The bulky evaporation unit (see 22 of FIG. 1) of conventional mobile oil recycling systems is replaced by the liquid and gas removal chamber 54.

The removal of gas and liquid contaminants by the system 50 is based on surface area and pressure gradients and does not rely on electrical or exhaust heating. The rate of evaporation of a liquid is proportional to the exposed surface area of the liquid. Consequently, by expanding the surface area of a liquid in an evaporation chamber, the rate of evaporation of the liquid will increase accordingly.

In the present specific embodiment, the system 50 is adapted for use with high-grade synthetic oil that is resistant to breakdown. The synthetic oil enters the system 50 via an oil inlet 58 in a base 60 of the system housing 56. The inlet 58 includes a hollow tube 61 having an inlet orifice 62. Pressurized oil entering the system 50 via the inlet 58 passes through the tube 61 and out the orifice 62. The inlet orifice 62 shoots pressurized oil into a high velocity stream (not shown), i.e., a jet, tangent to the surface of the filter 52. The high velocity stream creates an oil circulation 64 in a centrifugal chamber 66 between the filter 52 and the system housing 56. The circulation 64 results in a centrifugal force that causes large particles 68 to flow to an outside wall 70 of the housing 56 and subsequently fall to the base 60 of the housing 56. This increases the life of the filter 52 and the time between filter changes. An electromagnet or permanent magnet may be fitted around the outside wall 70 to aid the centrifugal action in removing heavy metallic particles from circulation within the oil.

The metering orifice 62 may be omitted without departing from the scope of the present invention. The tube 61 may be extended or retracted, and the metering orifice 62 may be elevated or lowered, respectively. In addition, a pre-filter may be attached to the oil inlet 58. Furthermore, the inlet 58 may be located in another part of the housing 56, such as in the wall 70 or in the cap 72.

Oil in the centrifugal chamber 66 is partly contained by a cap 72 that screws onto the system housing 56. Oil flows from the centrifugal chamber 66 through the filter 52 and toward a cylindrical filter support wall 74 that has holes 78. The filter support wall 74 is a tube that is screwed into the base 60. Those skilled in the art will appreciate that the support wall 74 may be a part of the housing 56 or base 60 without departing from the scope of the present invention. In the present specific embodiment, the chamber 54 is at or approximately at atmospheric pressure.

At typical oil temperatures, such as 195° Fahrenheit, atmospheric pressure is lower than the vapor pressure for various volatile contaminants. The vapor pressure of the volatile contaminants must be sufficient to cause the contaminants to evacuate via the vent 86. Consequently, any pressure drop or flow restriction caused by the vent 86 should be minimized or eliminated. While the vent 86 is shown relatively narrow for illustrative purposes, in practice, the vent 86 is made as large as will fit in the chamber 54.

Oil passing through the filter 52 enters the contaminant removal chamber 54 via the holes 78. The oil is released from approximately engine pressure in the inlet 58 to approximately atmospheric pressure in the chamber 54. A first pressure drop occurs at the jet 62 of the hollow tube 61. A second pressure drop occurs across the filter 52. A third pressure drop occurs across the holes 78. The sum of the first, second, and third pressure drops are approximately equivalent to the difference between the pressure at the inlet 58 and atmospheric pressure. In the present embodiment, the pressure at the inlet is engine pressure less any pressure dropped across the hose (not shown) from the engine to the inlet 58. The size of the first, second, and third pressure drops are application-specific and may be determined by one skilled in the art with access to the present teachings to obtain a desired flow rate and to meet the needs of a given application.

Clean oil flows out of the chamber 54 back to the engine via an oil outlet 82. Gravity pulls oil out of the chamber 54 and back to the engine or engine oil pan. The holes 78 are drilled sufficiently small so that the rate of oil entering the chamber 54 and the rate of oil exiting the chamber 54 equalize, preventing the chamber 54 from filling up with oil.

As is well known in the art, the boiling point of a liquid is related to pressure. Lower pressures yield lower boiling points. Consequently, as the pressure of the oil lowers from approximately engine pressure in the oil inlet 58 to atmospheric pressure in the chamber 54, some liquid contaminants may vaporize on the inner surface of the chamber 54, and evacuate from the vent 86. Gaseous contaminants in solution may fizz out of solution and exit the vent 86. This is similar to soda fizzing when a soda can is opened, exposing the soda to atmospheric pressure. The carbon dioxide in solution in the soda vents and leaves the soda when the soda can is opened.

A special evaporation surface 80 exists on the inside of the support wall 74. The surface 80 is ridged and textured to maximize the surface area of the surface 80. The surface area of the surface 80 is significantly larger than the corresponding evaporation surface area (shown in FIG. 1 as 38) of conventional mobile recycling devices. The grooves ridged surface 80 may be implemented via threading. The dimensions of the threads are large enough relative to the thickness of the oil flowing over the threads so that oil flows in and out of the threads, increasing exposed surface area. Those skilled in the art will appreciate that a coarse surface merely roughened to promote a thinning of the oil will not result in expanded surface area as oil flows in and out of the grooves, since the grooves will be small relative to the thickness of the oil, and will not cause ripples on the surface of the oil. Furthermore, the deep threads yield spiral grooves, which promote capillary circulation dispersion about the surface 80. Capillary action oil distribution is discussed more fully below.

The extra size of the evaporation surface 80 obviates the need for an electric heater element. Heat from the operating environment of the engine is sufficient to allow the evaporation of contaminant liquids and the removal of contaminant gases from the oil via the evaporation surface 80. The textured evaporation surface 80 allows the system 50 to be installed on automobiles at a near horizontal angle since channeling, which would limit the effective surface area, is eliminated by the textured surface. A screen, mesh, other device may be fitted over the surface 80 to further increase the effective evaporation surface area of the contaminant removal chamber 54. The lightweight, space-efficient system 50 may be easily strapped or mounted to engine components at a variety of angles, making installation easy and cost effective.

The end cap 72 is screwed onto the housing 56. The end cap 72 is sealed against the top surface of the wall 74 via a washer 84, closing off the contaminant removal chamber 54. The cap 72 also contains grooves 88 for facilitating gripping of the cap 72. The contaminant removal chamber 54 includes a vent 86 for venting volatile contaminants from the chamber 54. In the present specific embodiment, the vent 86 includes a check valve to prevent oil from exiting the chamber 54 in case of an oil flow imbalance. The vent 86 is directed to an air intake (not shown).

In systems lacking heater elements, the check valve 86 preferably lacks a cracking pressure and provides minimum impediment to escaping volatile gases. Without a heater element, the vapor pressure may be less than the valve cracking pressure, which is the pressure required to open the valve, enabling vapors to escape. Consequently, volatile contaminants may not be vented. The vapor pressure is the pressure that volatile vapors exert on the inter surface of the evaporation chamber 54.

Furthermore, the longer and more narrow the vent 86, the more vapor pressure required to vent volatile contaminants from the system 50 at a given flow rate. Flow through a tube, such as a vent 86, may be approximated by the following well-known relation:

$$\Delta P = \frac{Q128\ \mu l}{\pi D^4} \qquad [1]$$

where ΔP (in this case) is the difference between the vapor pressure (less any cracking pressures) within the evaporation chamber 54 (or within the tube 200, 220, 230, or 240 of FIGS. 8–11, respectively) and the outside atmospheric pressure; Q is the flow rate of vapors out of the vent 86; $\mu$ is the viscosity of the vapors, l is the length of the vent 86, and D is the diameter of the vent 86. Similarly, $$Q = \frac{\pi D^4 \Delta P}{128\ \mu l}. \qquad [2]$$

An increase in the length l of the vent 86 decreases the flow rate Q unless ΔP is increased accordingly (D=constant). Similarly, a decrease in the diameter D of the vent 86 (l=constant) will result in a decrease in the flow rate Q. Furthermore, a decrease in the pressure difference ΔP will cause a reduction in contaminant flow rate Q. The pressure difference will decrease in systems employing vents with cracking pressures by the amount of the cracking pressure. If the cracking pressure is sufficiently large, ΔP will reduce to zero, and the flow rate Q will be zero.

Hence, to maintain a given flow rate Q>0 of contaminant vapors out of the vents (assuming vents of equal diameter), an increase in length l of a vent requires a corresponding increase in ΔP, which requires an increase in vapor pressure within the chamber 54 (assuming outside atmospheric pressure remains relatively constant). Since the vent 86 of the present invention is necessarily shorter than conventional vents, such as the vent disclosed in U.S. Pat. No. 5,824,211 to Lowry and the vent disclosed in U.S. Pat. No. 2,173,631 to Niedens, the vent 86 of the present invention requires a smaller ΔP and hence, a smaller vapor pressure to maintain a flow rate Q>0.

The positioning of the vent 86 of the present invention at the top of the evaporation chamber 54 facilitates circulation of contaminant vapors out of the system. The buoyant force of the contaminant vapors facilitates vapor evacuation from the system. If the vent 86 were disposed in the bottom of the evaporation chamber 54 as in some conventional systems, the buoyant force of the vapors would partially cancel the effective vapor pressure, yielding a smaller ΔP and a smaller corresponding flow rate Q. Furthermore, positioning the vent 86 at the top of the evaporation chamber 54 so that it extends through the ceiling of the evaporation chamber 54, allows more space to expand the diameter D of the vent 86 and thereby improve the flow rate Q. If the vent 86 were positioned at the bottom of the evaporation chamber 54, as in some conventional systems, such as that described in U.S. Pat. No. 5,824,211 to Lowry, the width of the vent is compromised, since a oil drain must be placed adjacent to the vent. The size of the oil drain is also compromised, which reduces oil circulation out of the system, and may undesirably increase the chance that oil will back-up in the system, covering the evaporation surface, and flowing out the vent.

By positioning the drain 82 at the bottom of the evaporation chamber 54 opposite the vent 86, the present invention allows for maximum volatile contaminant venting and maxim circulation of clean oil from the system by enabling a large vent 86 and drain 82, respectively.

In the present specific embodiment, the filter 52 is a high quality one-micron gradient-density filter that may be ordered from a filter supply house. The varying density of the filter 52 provides for a uniform dirt distribution, greatly extending the life of the filter 52. A gradient density filter, also called a graded density filter, has a relatively low density at an input surface and increases in density toward an output surface and thereby distributes contaminants of different sizes through the filter to prevent contaminant films or caked layers from forming and clogging the filter.

When installing the system 50, the oil inlet is connected to an engine pressure tap, such as an oil pressure sending unit. The oil outlet 82 is connected to an oil pan or valve cover operating at or near atmospheric pressure. Those skilled in the art will appreciate that check valves and flow control valves may be installed on the oil inlet 58 and the oil outlet 82 to further control the flow of oil to and from the system 50. In addition, a sleeve made of rubber or some other insulator may be fitted over the housing 56 to reduce heat loss from the system 50.

In the present embodiment, the housing 56, the end cap 72, and the filter support wall 74 are constructed of a lightweight metal alloy and may be manufactured at a conventional machine shop. The vent 86 may be constructed at a conventional machine shop. All materials are heat-resistant and corrosion-resistant.

Unlike the system 20 of FIG. 1, which has an undesirable oil heating effect, the system 50 has a desirable oil cooling effect. The oil sweats out liquid contaminants in the chamber 54. This has an oil cooling effect, as contaminant molecules having high kinetic energies evaporate. This lowers the average kinetic energy of the molecules in the oil and thus the temperature of the oil.

Figure 3:
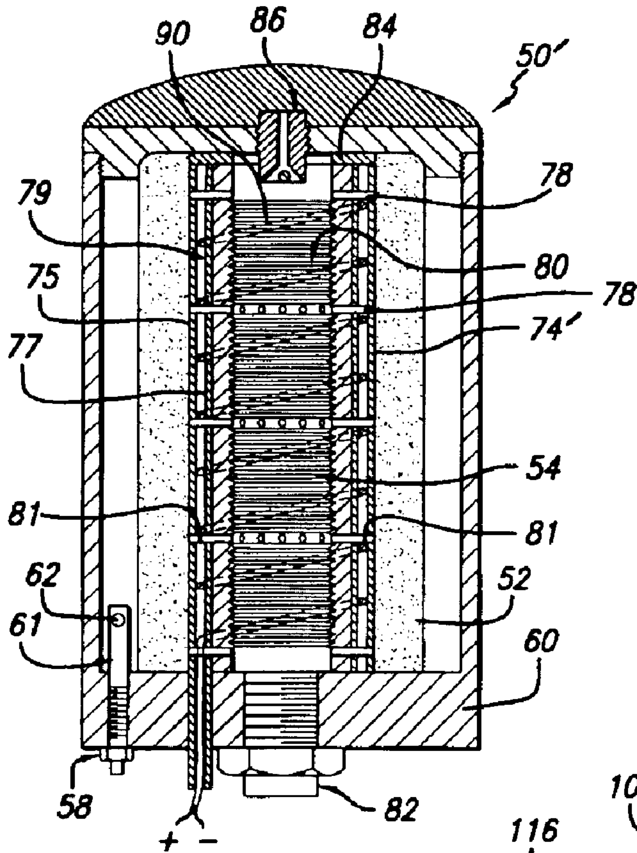
FIG. 3 is a cross-sectional view of a recycling system constructed in accordance with the teachings of the present invention that includes an electromagnet/heater.

FIG. 3 is a cross-sectional view of recycling system 50' constructed in accordance with the present invention and including an evaporation heater 90 implemented as a heating coil that also acts as an electromagnet. The electric heating coil 90 is imbedded in a wall 74'. The embedding may be performed at a conventional machine shop. The wall 74' includes a first cylindrical wall 75 and a concentric second cylindrical wall 77 having a smaller radius than the wall 75. The coil 90 is rapped around the second cylindrical wall 77. The first wall 75 is placed adjacent to the second wall 77, forming a coil space 79 where the coil 90 resides. The coil 90 has a conventional protective sleeve (not shown) that prevents oil from contacting the coil itself. The holes 78 are fitted with conventional oil resistant sleeves 81 to prevent oil from entering the coil space 79. The concentric walls 75, 77 are sealed at the top by the ring washer 84.

The coil 90 has a resistivity and voltage differential sufficient to heat the chamber 54 to approximately 195° Fahrenheit and may be powered by an engine alternator (not shown), battery, (not shown) or other means. The heat from the coil 90 facilitates contaminant evaporation from the surface 80 when oil from the oil inlet 58 is not sufficiently hot to separate liquid and gas contaminants from the oil on the surface 80.

Those skilled in the art will appreciate that the coil space 79 may be filled with an oil resistant epoxy after the coil 90 is wrapped around the second wall, and before the holes 78 are drilled. This obviates the need for the protective coil sleeve (not shown), and the oil resistant sleeves 81. In addition, the coil 90 may be replaced by a different type of heater; the coil 90 may extent partially up the wall 77; or a pre-heater may be attached to the inlet 58 without departing from the scope of the present invention. Furthermore, those skilled in the art will appreciate that another type of heater placed in another location such as an in-line heater connected to the oil inlet 58 may be used instead of the coil 90 to heat the oil without departing from the scope of the present invention.

Figure 4:
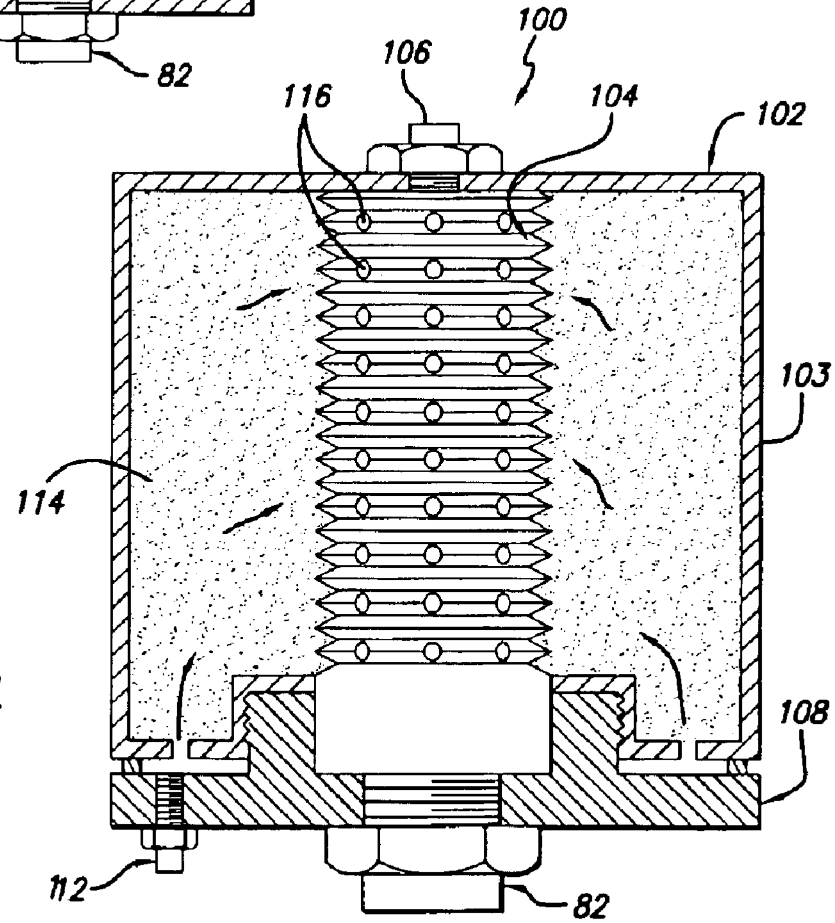
FIG. 4 is a cross-sectional view of a first alternative embodiment of the present invention including a spin-on filter.

FIG. 4 is a cross-sectional view of an alternative embodiment 100 of the present invention including a spin-on filter 102 having a spin-on filter canister 103. The filter 102 is a filter of conventional design with the exception that the filter 102 includes a special interior surface 104 and a vapor vent 106. By employing off-the-shelf parts, implementation of the system 100 is greatly facilitated.

The filter 102 is screwed onto a base plate 108 that includes an oil outlet 82 and an oil inlet 112. Pressurized oil from an engine (not shown) enters the filter 102 through a base plate 108 and space between the base plate 108 and the base of the filter. Oil passes through a filtering element 114 included in the filter 102 where solid contaminants are removed, and some liquid contaminants are absorbed and/or neutralized. The pressurized oil, free of solid contaminants, is released to atmospheric pressure as it passes through the special surface 104 via small holes 116. The holes 116 are drilled sufficiently small to prevent oil from backing up inside the filter 102. This change in pressure facilitates vaporization of liquid contaminants and the separation and removal of gas contaminants from the oil. The special surface 104 is grooved and roughened to facilitate the dispersion of oil across the surface 104. Oil disperses into a thin film across the surface 104 where the oil that has been heated by the engine releases any liquid or gas contaminants. The oil then flows out of the alternative embodiment 100 via the oil outlet 82 in the base plate 108.

Figure 5:
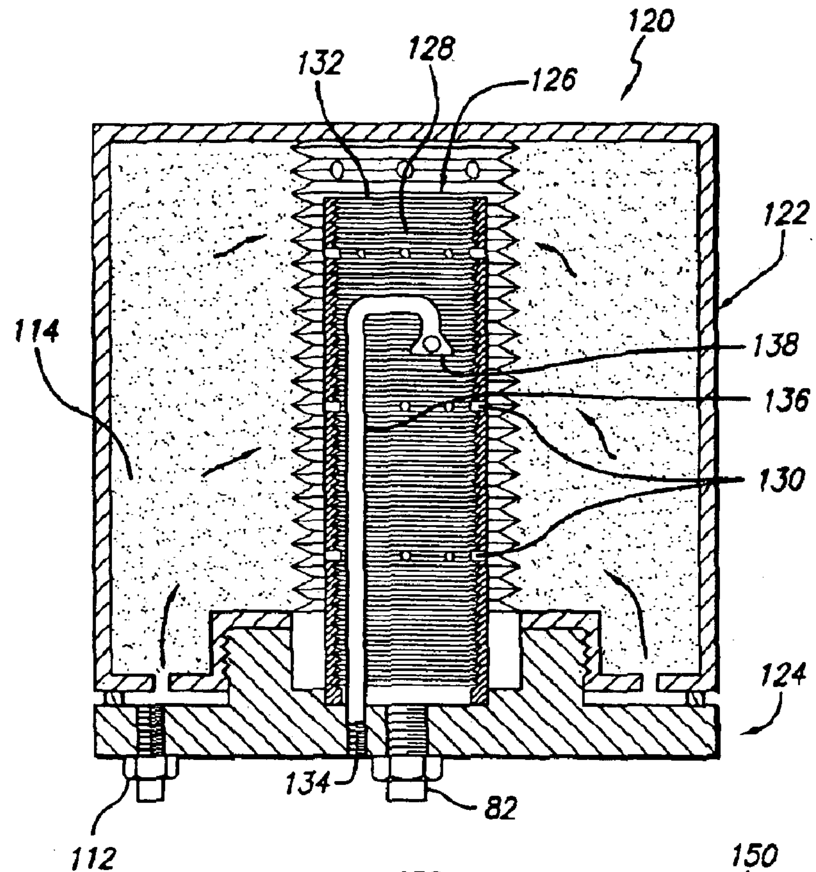
FIG. 5 is a cross-sectional view of an illustrative embodiment of the present invention.

FIG. 5 is a cross-sectional view of an illustrative embodiment 120 of the present invention adapted for use with a conventional spin-on filter 122. The illustrative embodiment 120 includes a plate 124, and an evaporation attachment 126. The attachment 126 is a tube having a textured inside surface 128 with holes 130 and is screwed into the plate 124. Oil cleaned by the filter 102 may flow through the holes 130 and over a top 132 of the evaporation attachment 126. Those skilled in the art will appreciate that oil flow may be prevented from flowing over the top 132 without departing from the scope of the present invention.

The operation of the illustrative embodiment 120 is analogous to the operation of the alternative embodiment of FIG. 4 with the exception that vapors vaporized form the surface 128 may exit through the plate 124 instead of the top of the filter 120. The plate 124 has a vapor outlet 134. A vapor tube 136 extends from the vapor outlet 134 and opens into the evaporation attachment 126. In the present embodiment, the vapor tube 136 includes a conventional ball valve 138 to prevent oil from escaping out the vapor outlet 134 via the vapor tube 136. While the vapor tube 136 is shown extending through the base 124, in most applications, it is preferable that the vapor tube 136 extend through the spin-on filter housing 122 in the top of the system 120. The vapor tube 136 is shown extending from the base in FIG. 5, since in some applications, where venting of volatile contaminants in not as critical, it may be desirable to not alter the off-the-shelf filter 122.

Figure 6:
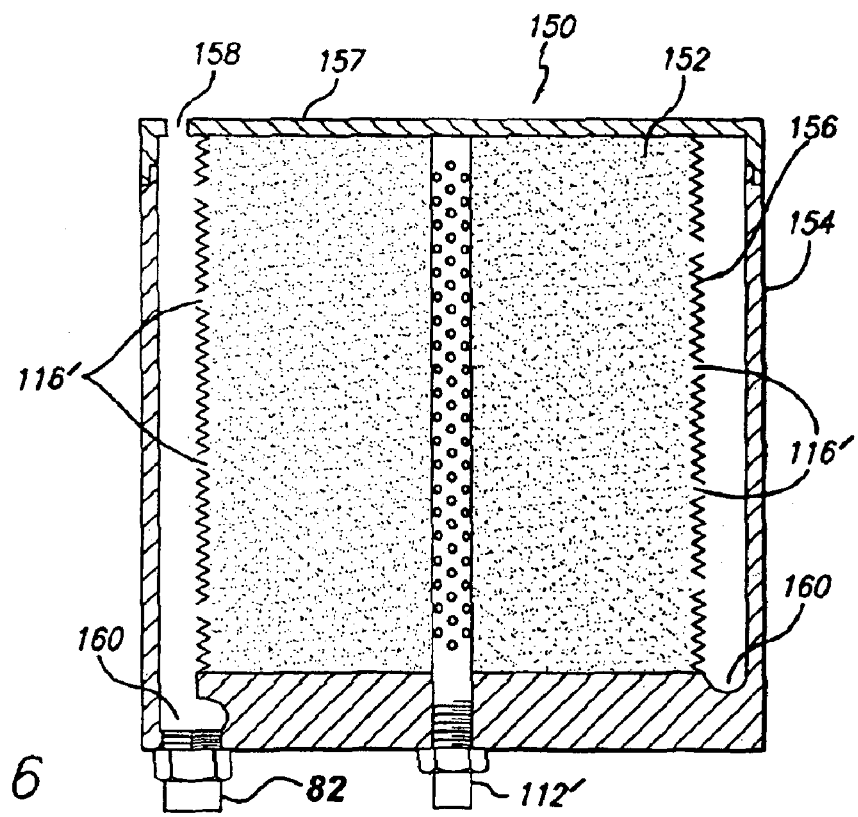
FIG. 6 is a cross-sectional view of a second alternative embodiment of the present invention.

FIG. 6 is a cross-sectional view of a second alternative embodiment 150 of the present invention. The system 150 includes a filter 152 surrounded by an expanded evaporation surface 156.

Heated, pressurized oil enters the system 50 via an oil inlet 112'. Oil flows through the filter 152 and onto the evaporation surface 156 via the small holes 116'. Oil passing through the holes 116' is released to atmospheric pressure, facilitating the vaporization of contaminants from the oil on the surface 156. Vapors are vented through a vent aperture 158, and clean oil drains back to the engine (not shown) via an oil outlet 82. A groove 160 varies in depth around the circumference of the system 50, helping to direct oil to the oil outlet 82 and preventing oil coagulation in the groove 160.

Figure 7:
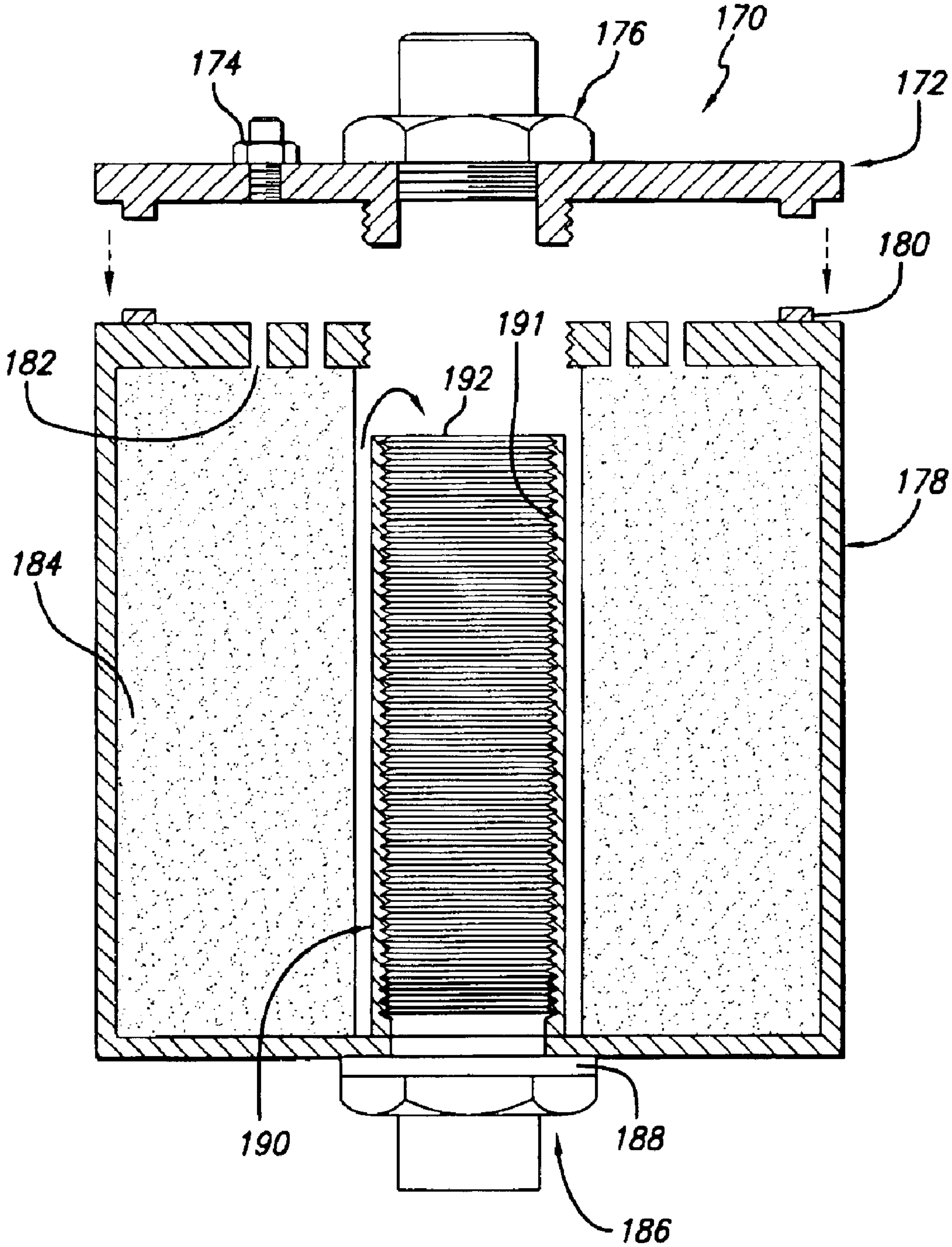
FIG. 7 is a cross-sectional view of a third alternative embodiment of the present invention.

FIG. 7 is a cross-sectional view of a third alternative embodiment 170 of the present invention. The oil recycling system 170 includes an end cap 172. The end cap 172 includes a pressure inlet 174 and an evaporation vent tube 176. The vent tube 176 is made large to minimize the amount of vapor pressure required to vent contaminants. A filter housing 178 screws onto the end cap 172, which seals to the housing 178 at a first oil-tight seal 180. The filter housing 178 has oil inlet passages 182 that feed pressurized oil from the oil inlet 174 to a low-micron or sub-micron filtering media 184. An evaporation/drainage assembly 186 screws into the bottom of the filter housing 178 and forms a second oil-tight seal 188. The evaporation/drainage assembly 186 includes a threaded pipe 190 that extends into a center space partially surrounded by the filter media 184. Threads 191 of the pipe 190 provide a large evaporation surface for oil entering the pipe from the filter media 184.

Oil flows from the filter media 184 and over the top of the pipe 192. The oil then flows over the threads 191, where vaporized contaminants pass out the vent tube 176. The rate of oil flow through the oil recycling system 170 is controlled by a conventional flow-control valve (not shown) connected to the oil inlet 174. The flow of oil is controlled so that a thin film flows over the threads 191 in the pipe 190. The depth of the film is on the order of the dimensions of the threads 191.

The end cap 172 may be constructed at an ordinary machine shop. All other components or parts may be purchased separately at a hardware store or filter supply house.

The novel design of the oil recycling system 170 is facilitated by the unique combination of the end cap 172 with the evaporation/drainage assembly 186, which are easily adaptable to existing filter housings.

Those skilled in the art will appreciate that a co-linear embodiment of the present invention may be implemented wherein the filter and evaporation surface are not concentric without departing from the scope of the present invention.

Figure 8:
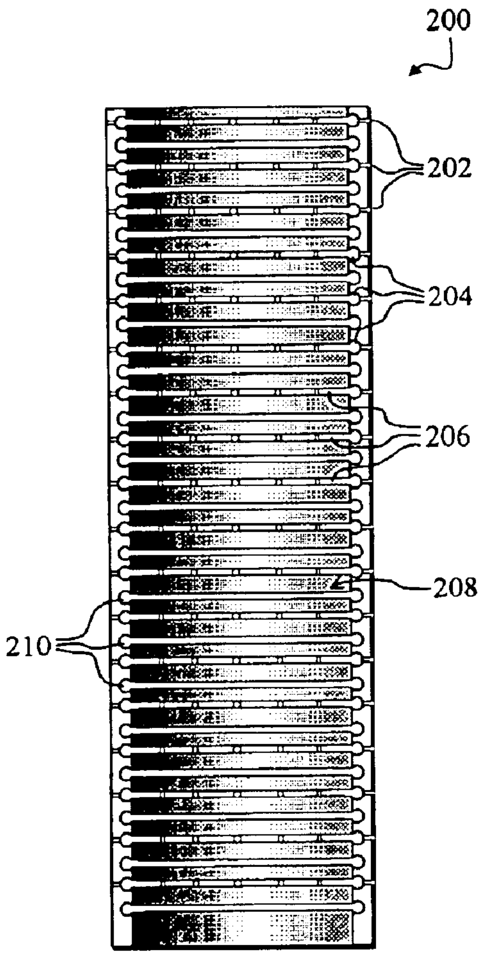
FIG. 8 is a cross-sectional diagram of an evaporation tube having a special three-dimensional evaporation surface constructed in accordance with the teachings of the present invention, and which may be employed in the embodiments of FIGS. 2–6.

FIG. 8 is a cross-sectional diagram of an evaporation tube 200 having a special three-dimensional evaporation surface 208 constructed in accordance with the teachings of the present invention, and which may be employed in the embodiments of FIGS. 2–6. The evaporation tube 200 includes various perforations 202 in the tube wall that communicate with capillary channels 204 that extend about the circumference of the inner surface 208 and are disposed at various vertical positions along the inner surface 208 of the tube 200. The perforations 202 are distributed about the capillary channels 204. Additional capillary channels 210, which lack perforations, are interspersed between the capillary channels 204. The capillary channels 204 and 210 have capillary channel openings 206 that open into the inner surface 208. The capillary channels 204 and 210 may be implemented on the outside surface of the tube 200 for use with the embodiment 150 of FIG. 6. The capillary channels 204 are partially circular and are sufficiently shaped to distribute oil about a circumference of the evaporative inner surface 208 when the fluid cleaning system and the evaporation chamber are in a horizontal position.

In operation, oil passes through the outer wall of the tube 200 into the capillary channels 204 via the perforations 202. As oil passes into the capillary channels 204, capillary action of the oil in the channels 204 causes the oil to disperse quickly about the circumference of the channels 204. After oil disperses about the circumference of the tube 200 via capillary action, the oil leaks out of the capillary channel openings and flows across the inner surface to the additional capillary channels 210. The inner surface 208 is a coarse surface that is roughened, such as via sand paper or honing, to further facilitate oil dispersion about the inner surface 208. As oil flows into the additional capillary channels 210, it re-disperses about the circumference of the inner surface 208 of the tube 200 via the capillary action caused by the additional channels 210.

In some systems, such as the system disclosed in U.S. Pat. No. 2,133,359, to Miller, a corrugated surface is employed to expand evaporation surface area as oil flows over the corrugations. However, the design and dimensions of the corrugations are unlikely to cause capillary action dispersion of oil about the evaporation surface. Furthermore, the surface of Miller is substantially conical, creating wasted space, and lacks radial perforations therethrough for distributing oil evenly about the surface.

In the present specific embodiment, the capillary channels 202 have a cross-section that is approximately five-eighths of a circle. Those skilled in the art will appreciate that other types of cross-sections may be employed without departing from the scope of the present invention. For example, the capillary channels 204 may have a semi-circular cross-section or a cross-section that forms three-fourths of a circle (¾ circular cross-section). Furthermore, those skilled in the art will appreciate that the perforations 202 may be placed in other locations other than coincidental with the capillary channels 204 without departing from the scope of the present invention. In addition, the additional capillary channels 210 may be omitted. The exact number, size, and shape of the perforations 204 are application-specific and may be determined by one skilled in the art with access to the teachings of the present invention to meet the needs of a given application. Similarly, the exact number, size, and spacing of the capillary channels 204 and 210 are application-specific. In the preferred embodiment, the dimensions of the channels 204 and 210 are chosen to cause capillary action dispersion about the entire circumference of the evaporation surface 208 at all intended installation angles. The maximum number of channels 204 and 210 with these dimensions that can fit on the inner surface 208 of the tube 200 are employed.

Alternatively, the perforations 202 are positioned outside the capillary channels 204 and may have a star-shaped, square-shaped, or other polygon-shaped cross-section to reduce beading of the oil as it exits the perforations 202 and disperses onto the inner surface 208.

Capillary action dispersion is based on surface tension at the interface between oil in the capillary channels 202, the mixture of air and vapors within the evaporation chamber tube 200, and the surfaces of the capillary channels 204 and 210. The surface tension $\sigma$ is the intensity of the molecular attraction per unit length along this interface.

Capillary action is easily observed in the laboratory by inserting one end of a narrow clear open-ended tube into oil. The oil will rise in the tube above the oil level outside of the tube. The oil adheres to the inner surface of the tube. The adhesion is sufficiently strong to overcome the mutual attraction (cohesion) of the oil molecules and pull them up the wall of the tube. The height h at which the oil rises is a function of the surface tension $\sigma$, the tube radius R, the specific weight of the liquid $\gamma$, and the angle of contact $\theta$ between the oil and the clear tube. The vertical force due to surface tension is $2\pi R\sigma\cos\theta$ and is balanced by the weight of the fluid in the tube that has risen above the outside oil level, which is $\gamma\pi R^2 h$. Hence, the height that the oil rises in the tube is given by the following equation;

$$h = \frac{2\sigma\cos\theta}{\gamma R} \quad [3]$$

Similarly, capillary channels 204 in the tube 200 of FIG. 8 pull oil around the channels with a force of approximately $\frac{5}{8}2\pi R\sigma\cos\theta$32 $1.25\pi R\sigma\cos\theta$, where R is the diameter of the capillary channels 204 and 210, and $\sigma$ is the surface tension of the oil. The factor of ⅝ is included to account for the missing ⅜ of the tube, since the cross-section of the capillary channels 204 and 210 represent ⅝ of a circle, i.e., the openings 206 represent ⅜ of a circumference. Factors other than ⅝, such as ½ or ¾, may be employed instead. The exact factor is application-specific.

In a vertical installation, oil will be pulled around the entire circumference of the evaporation tube 200, since the force pulling the oil around the capillary channels 204 is not impeded by the weight of the oil. In a near-horizontal installation, the capillary channels 204 and 210 will still pull oil completely around the circumference of the evaporation tube 200. Siphoning action of the oil flowing down (due to gravity) one side of a capillary channel pulls oil up the other side of the channel, balancing the effects of gravity and ensuring maximum oil dispersion about the evaporation surface 208.

The surface tension σ of a liquid such as oil decreases as temperature increases. Similarly, as the temperature decreases, the surface tension σ increases. This causes oil to disperse more thoroughly about the evaporation surface when needed, such as when the oil is relatively cool. This helps maintain an effective evaporation rate of volatile contaminants at various temperatures. Capillary action dispersion will still work at higher temperatures but may work better at lower temperatures, where the capillary action is needed more to maintain the evaporation rate at the surface 208. The evaporation rate is proportional to the exposed surface area. The exposed surface area is maximized via use of the capillary channels 204 and 210.

Unlike conventional systems, such as the system disclosed in U.S. Pat. No. 5,824,211 to Lowry, the perforations 202 in the tube 200 are distributed in two dimensions relative to the inner evaporation surface 208 of the tube 200. This perforation distribution further maximizes oil dispersion about the inner surface and thereby maximizes the evaporation surface area and, consequently, the rate of evaporation of volatile contaminants from the surface 208. Furthermore, distributing the holes in two dimensions about the surface 208 minimizes the negative effects of channeling on evaporation rate when the systems are installed at an angle.

Conventional systems, such as the system disclosed in Lowry, result in prohibitive channeling when the systems are installed at an angle, which is partially due to the linear hole distribution. This channeling may reduce effective evaporation surface area by a factor of five or more. Although the system disclosed in Lowry discloses a coarse surface, the coarseness of the surface is insufficient to cause significant capillary action dispersion about the surface. This is partly because the radius of such very small grooves (which are too small to be seen in the figures of Lowry), as might be caused via sandpaper, will cause any capillary action force to be approximately zero.

Figure 9:
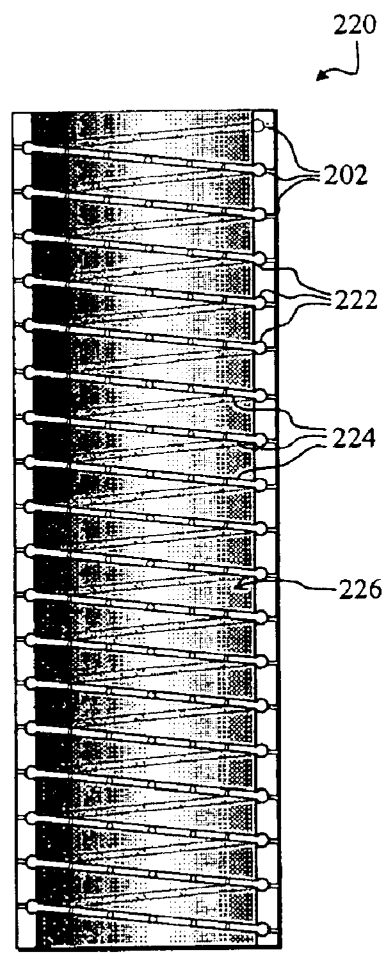
FIG. 9 is a cross-sectional diagram of a first alternative embodiment of the evaporation tube of FIG. 8.

FIG. 9 is a cross-sectional diagram of a first alternative embodiment 220 of the evaporation tube 200 of FIG. 8. The alternative evaporation tube 220 includes the perforations 202, which coincide with a spiral capillary channel 222, which is open to the inner evaporation surface 226 at the spiral channel opening 224. The spiral shape further facilitates dispersion of the oil about the inner evaporation surface 226, since the capillary action caused by oil surface tension within the channel 222 is augmented by gravity pushing oil down and around through the channel 222. The component of gravity pushing oil around the capillary channel 222 is $F_g \sin\theta$, where $F_g$ is the force due to gravity, and θ is the angle at which the spiral channel 222 forms with a horizontal plane perpendicular to the tube 220. This helps ensure that all or most of the interior surface 226 is wetted with oil to facilitate evaporation of volatile contaminants from the oil.

Figure 10:
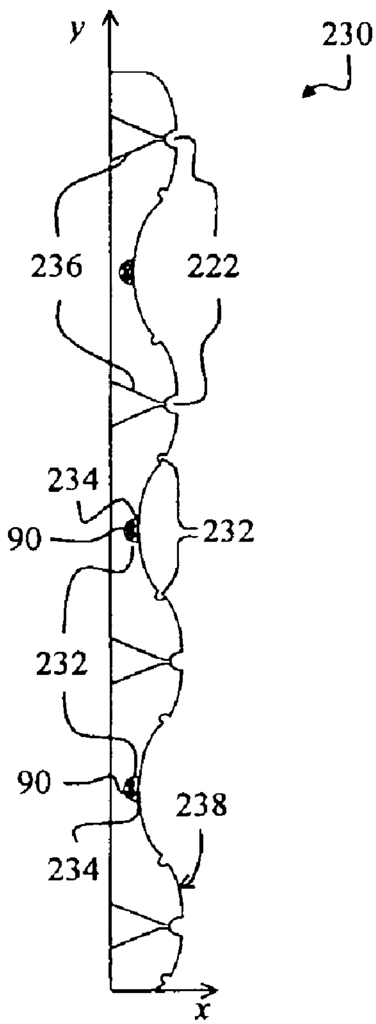
FIG. 10 is cross-sectional diagram of a contoured evaporation tube wall having various capillary channels and employing the electromagnet/heater of FIG. 3.

FIG. 10 is cross-sectional diagram of a contoured evaporation tube wall 230 having various capillary channels 222 and 232 and employing the electromagnet/heater coil 90 of FIG. 3. The capillary channels 222 are fed by special cavitation perforations 236. The heater coil 90 is inserted in a coil channel 90 and sealed with industrial grade epoxy 234.

It is well known in the art that a moving charge, i.e., a current, creates a magnetic field. Consequently, the heater coil 90 also acts as an electromagnetic. The heat output by the coil is a function of the resistance (R) of the coil and the current (I) flowing through the coil ($P=I^2R$). In some applications, where the heating function is undesirable, the resistance of the coil 90 is chosen to be relatively small for a given current. To increase the magnet strength, the current is made larger.

The electromagnet/heater coil 90 will attract any remaining metallic particles to the surface 238 of the tube wall 230. When current is shut off from the coil 90, the electromagnet action stops, allowing for easy cleaning of the surface 238. Between servicing, metallic particles attracted to the surface 238 may temporarily lodge in the capillary channels 232 when current is shut off from the coil 90. This prevents the particles from flowing back to the engine. Furthermore, in many applications, the fine nature of any remaining particles may produce cohesive film that sticks to the surface 238 near the coil 90. This film sticks to the surface 238 until cleaned.

In the preferred embodiment, the number of capillary channels 222 and 232 and the relative spacing of the capillary channels 222 and 232 are chosen to maximize evaporation surface area. In some applications, this may require that the channels be directly adjacent to each other. The capillary channels 222 and 232 are spiral channels like the channels of the system 50' FIG. 9.

Suppose, for example, that the general cross-sectional shape of the evaporation surface 238 follows a sinusoidal contour such that approximately ten cycles occur within approximately 2π inches, which is approximately 6.28 inches, and that the distance from peak to trough is approximately 0.10 inches. The sinusoidal contour is given by the following equation:

$$x=0.05\cos(10y) \qquad [4]$$

where y is a variable representing a vertical or height component, and x is a variable representing the horizontal or width component as shown in FIG. 10. In the present example, suppose the length of the evaporation tube 230 is 9.0 inches. The length L of the cross-section (not including dips of the capillary channels 222 and 232) of the surface 238 is given by the following equation:

$$L=\int_0^9 \sqrt{(1+(0.5\sin 10y)^2}\,dy \approx 9.5 \text{ in.} \qquad [5]$$

Consequently, the cross-sectional length of the surface 238 is expanded by approximately 0.5 inches, which is greater than 5 percent. Hence, the effective evaporation surface area is expanded by a similar percentage. Such improvements are important in automobile mobile oil recycling systems lacking heaters, where surface area maximization is required to maximize volatile contaminant evaporation and to accommodate device size constraints. The surface area may be expanded by much greater than five percent by choosing a different function than that given in equation (4), such as a function with a larger amplitude and higher frequency.

The exact contour is application-specific. The maximum amplitude and frequency of the sinusoidal contour before dripping occurs is increased by the use of the capillary channels 222 and 132. If the amplitude of the sinusoidal contour is made large (causing deep contours) and the frequency relatively high, oil may drip from the tops of the contours. This may actually further enhance evaporation surface area, since the surfaces of the oil drops themselves may act to increase effective evaporation surface area within the evaporation chamber. If the flow rate becomes too large, the oil may not adequately cover the entire surface 238 and may pour instead of drip from the surface 238 at various positions. Those skilled in the art with access to the present teachings will know how to determine the optimal flow rate for a given application.

The special cavitation perforations 236 will cause oil to squirt from the perforations 236 in applications having sufficient pressure drop across the wall 230. By adjusting the pressure drop and the dimensions of the funnel-shaped cavitation perforations 236, cavitation of liquid contaminants may result near the surface 238. Cavitation occurs when the pressure of a liquid decreases to its vapor pressure, causing the liquid to boil. To cause cavitation of liquid contaminants, a low pressure must be created. In the present embodiment, the low pressure is created as oil is funneled by the cavitation perforations 236, creating a high-velocity jet. The pressure drop across the cavitation perforations 236 is chosen relative to the dimensions of the cavitation perforations 236 so that the velocity of the jets are sufficient to cause cavitation of the desired liquid contaminant. Without undue experimentation, those skilled in the art can employ the Bernoulli equation ($p_1+0.5\rho V_1^2+\gamma z_1=p_2+0.5\rho V_2^2+\gamma z_2$) and the continuity equation ($A_1V_1=A_2V_2$) to select an appropriate pressure drop and cavitation perforation dimensions for a given application.

Cavitation may be demonstrated via an ordinary garden hose by kinking the hose to cause a sufficient restriction in the flow area. The water velocity through this restriction is relatively large, causing the hose to hiss, as vapor bubbles are formed in the hose due to cavitation.

As oil shoots from the cavitation perforations 236 into an evaporation chamber formed by the wall 230, certain liquid contaminants boil and vaporize, facilitating their removal from the oil. Furthermore, as oil splashes inside the evaporation chamber, the individual oil droplets and liquid contaminant droplets provide additional evaporation surface area. As the splashing droplets strike the wall 236, they are caught by the capillary channels 222 and 232 and are spread over the surface 238, and a thin film with minimal surface tension subsequently forms on the surface 238. Any remaining metallic particles are removed via the electromagnetic coil 90. The resistance of the coil 90 may be tuned to achieve a desired temperature on the surface 238, which is conducive to the efficient removal of liquid and gaseous contaminants.

Figure 11:
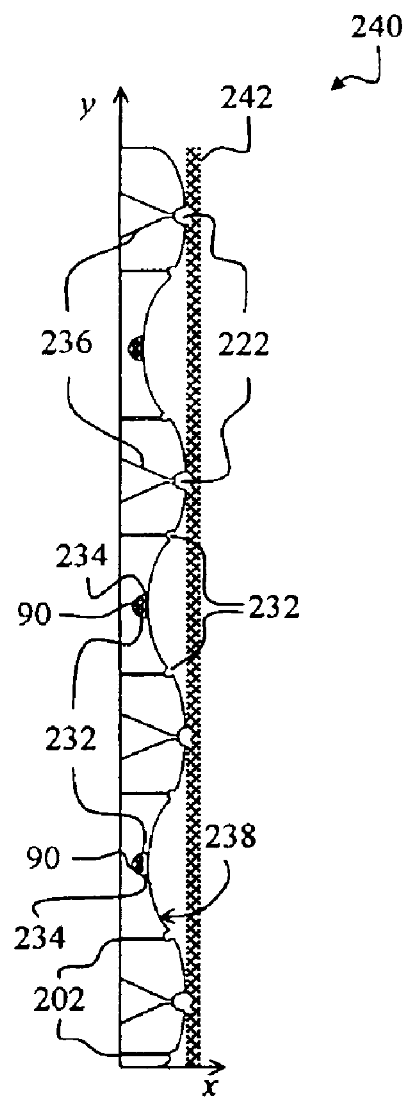
FIG. 11 is a cross-sectional diagram of the contoured evaporation tube wall of FIG. 10 fitted with a mesh and including additional perforations.

FIG. 11 is a cross-sectional diagram of a contoured evaporation tube wall 240 fitted with a mesh 240 and including additional perforations 202. The mesh 240 further increases effective evaporation surface area as oil flows around the individual mesh fibers. The additional perforations 202 ensure that the entire surface 238 is coated with oil.

Figure 12:
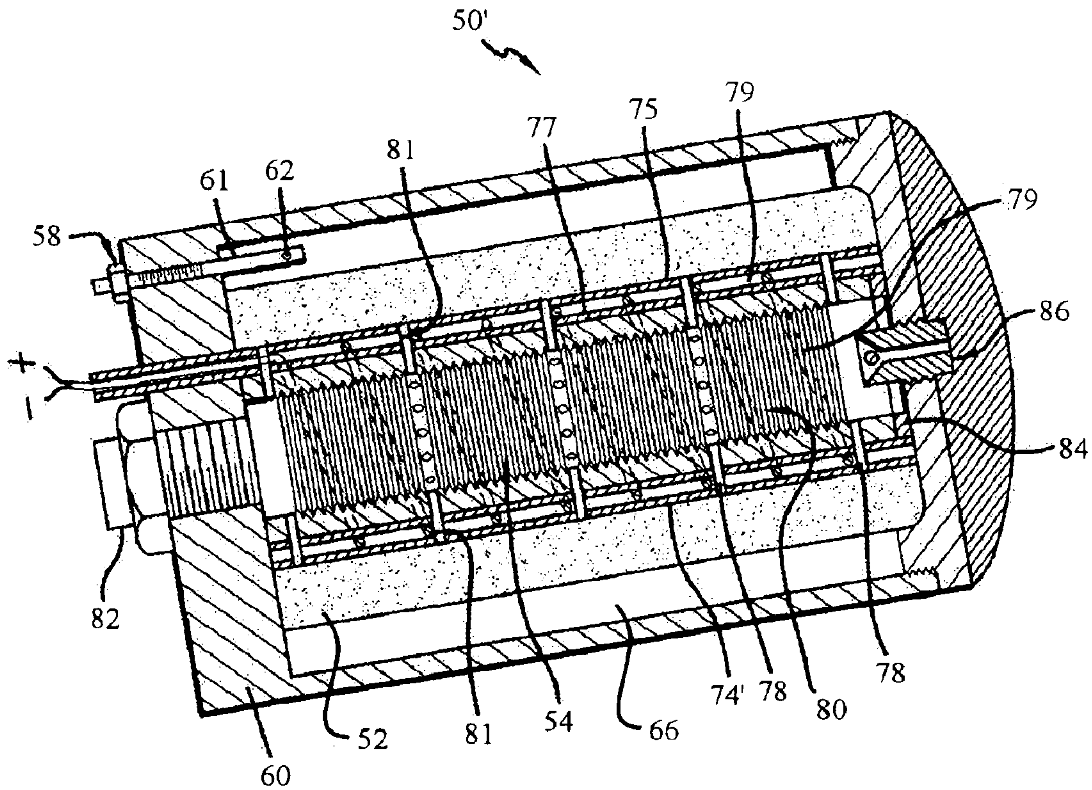
FIG. 12 shows the embodiment of FIG. 3 angled in a near horizontal position.

With reference to FIG. 2, FIG. 10, and FIG. 12, the system 50 is an efficient fluid cleaning system 50 that includes a first means for changing the pressure of a fluid, such as oil, from a first pressure to a second pressure, the second pressure lower than the first pressure. In the present specific embodiment, the first pressure, which occurs in the inlet 58 is approximately engine pressure, and the second pressure, which occurs in the contaminant removal chamber 54 is approximately atmospheric pressure. In the specific embodiment of FIG. 3, the first means includes the inlet orifice 62, the filter 52, the holes 78 or cavitation jets 236 of FIG. 10 in the evaporation surface 80 or 238, and the vent 86, which causes the chamber 54 to be at approximately atmospheric pressure.

Furthermore, the efficient fluid cleaning system 50 includes a second means for distributing the fluid within the evaporation chamber 54 at the second pressure, wherein the evaporation chamber 54 includes an evaporation surface 80, 238 having capillary channels 232, 222 for dispersing oil about the evaporation surface via capillary action to facilitate evaporation of contaminants from within the fluid. In the present specific embodiment, the second means is implemented via the capillary channels 232, 222, and the wall 230 or the threaded second cylindrical wall 77 with accompanying holes 78 therethrough. Those skilled in the art will appreciate that other hardware may be employed to implement the first means and second means without departing from the scope of the present invention.

The system 50 includes a means for employing siphoning action to disperse the fluid about the evaporation surface 54, 238 when the efficient fluid cleaning system 50 is installed at an angle so that the evaporation chamber 54 is angled (see FIG. 12). In the present specific embodiment, the means for employing siphoning action is implemented via the capillary channels 222, 232 or threads of the second cylindrical wall 79.

The system 50 further includes means for squirting the fluid, such as oil, within the evaporation chamber 54 to enhance effective evaporation surface area. In the present specific embodiment, the means for squirting is implemented via the cavitation jets 236 of the surface 238 of FIG. 10. The cavitation jets 236 also act as a means for causing cavitation of volatile contaminants to facilitate evacuation of the contaminants from the system 50.

In the present specific embodiment, the first means may be considered to include the cavitation jets 236 in an implementation wherein the second pressure within the chamber 54 is sufficiently low relative to the first pressure to promote cavitation. As discussed above, one skilled in the art may employ Bernoulli's equation and the continuity equation to calculate the requisite pressure drop to produce cavitation via the cavitation jets 236.

In the present specific embodiment, the second means, which facilitates distributing fluid in an evaporation chamber may be considered to further include, in addition to the spiral capillary channels implemented via the threaded surface 54 and the channels 222 and 232 of FIG. 10, the cavitation jets 236. As discussed above, the cavitation jets 236 help to facilitate evaporation of contaminants within the fluid to be cleaned, which is oil in the present embodiment.

The capillary channels 222, 232 of the surface 238 of FIG. 10 and the general contour of the surface 238 and threads of the surface 54 of FIG. 3 and FIG. 12 may be considered as implementing a means for expanding an evaporative surface area of the evaporation chamber 54 over that of a substantially flat surface.

In the present specific embodiment, the filter 52 and accompanying jet 62 for creating a centrifugal flow may be considered as implementing first means for removing solid matter from the fluid to be cleaned. The cavitation jets 236 of FIG. 10 may be considered as implementing a second means for facilitating vaporizing certain liquids and/or gases in the fluid to be cleaned by squirting the fluid in an evaporation chamber 54 to increase exposed surface area of the fluid in the evaporation chamber 54.

Those skilled in the art will appreciate that other hardware may be employed to implement the various means discussed above without departing from the scope of the present invention.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. An efficient fluid cleaning system comprising:

first means for changing the pressure of a fluid from a first pressure to a second pressure, said second pressure lower than said first pressure and second means for distributing said fluid within an evaporation chamber at said second pressure, said evaporation chamber including an evaporation surface having capillary channels for dispersing fluid about said evaporation surface via capillary action to facilitate evaporation of contaminants from within said fluid.

2. The system of claim 1 wherein said second means includes means for employing siphoning action to disperse said fluid about said evaporation surface when said efficient fluid cleaning system is installed at an angle so that said evaporation chamber is angled.

3. The system of claim 2 wherein said evaporation chamber includes substantially parallel or cylindrical walls to maximize fluid circulation out the system and to maximize the compactness of the fluid cleaning system, and wherein said evaporation surface is contoured to promote dripping from edges of the contours to enhance effective evaporation surface area via the surfaces of resulting fluid drops.

4. The system of claim 1 wherein said capillary channels are spiral capillary channels, and wherein said fluid cleaning system further includes a vent for venting said contaminants through a ceiling of said evaporation chamber.

5. The system of claim 4 wherein said vent includes a valve lacking a cracking pressure, said valve preventing the escape of said fluid from said system, and wherein said evaporation surface includes polygon-shaped perforations therein for allowing said fluid to pass radially through walls of said chamber and onto said evaporation surface, said perforations distributed in at least two dimensions relative to said evaporation surface.

6. The system of claim 4 further including a housing, a filter disposed therein, said evaporation chamber surrounded by said filter, said filter disposed within said housing so that a space exists between said filter and said housing wherein said fluid can circulate.

7. The system of claim 4 wherein said capillary channels are partially circular and are sufficiently deep to distribute fluid about a circumference of said evaporation chamber when said fluid cleaning system and said evaporation chamber are in a near horizontal position.

8. The system of claim 1 further including means for squirting said fluid within said evaporation chamber to enhance effective evaporation surface area.

9. The system of claim 8 wherein said means for squirting further including means for causing cavitation of said contaminants to facilitate evacuation of said contaminants from said system.

10. The system of claim 9 wherein said means for causing cavitation includes one or more cavitation jets opening into said evaporation chamber, said one or more cavitation jets including funnel portions for accelerating said fluid to create a sufficiently low pressure to cause cavitation of said contaminants.

11. The system of claim 1 further including a heater coil disposed about said evaporation chamber.

12. An efficient fluid cleaning system comprising:

first means for changing the pressure of a fluid from a first pressure to a second pressure, said second pressure lower than said first pressure and sufficient to cause cavitation of contaminants in said fluid and second means for distributing said fluid within an evaporation chamber at said second pressure to facilitate evaporation of contaminants within said fluid.

13. The system of claim 12 wherein said evaporation chamber includes an evaporation surface that is at least partially surrounded by a heater coil and one or more spiral capillary channels.

14. An efficient evaporation surface for a mobile oil recycling system comprising:

a surface contour for expanding the surface area of said evaporation surface over that of a substantially flat surface by at least five percent, said surface contour having perforations therein for allowing oil to pass therethrough and onto said evaporation surface and capillary channels at various positions along said surface contour for distributing oil about said evaporation surface.

15. An efficient fluid cleaning system comprising:

first means for changing the pressure of a fluid from a first pressure to a second pressure, said second pressure lower than said first pressure and sufficient to cause cavitation of contaminants in said fluid;

second means for distributing said fluid within an evaporation chamber at said second pressure via one or more spiral capillary channels and one or more cavitation jets to facilitate evaporation of contaminants within said fluid;

heater coil heating said evaporation chamber; and a filter for removing solid contaminants from said fluid, said filter surrounding said evaporation chamber; and a space between an oil inlet and said filter to facilitate distribution of fluid about one or more input surfaces of said filter.

16. An efficient fluid cleaning system comprising:

a housing having a filter disposed therein;

an inlet opening into a first space in said housing between said inlet and said filter to facilitate distribution of fluid, at a first pressure, about one or more input surfaces of said filter;

an evaporation chamber exposed to a second pressure lower than said first pressure, said evaporation chamber partially surrounded by an output surface of said filter;

means for expanding an evaporative surface area of said evaporation chamber over that of a substantially flat surface; and an outlet in communication with said evaporation chamber and positioned in a base of said housing.

17. An efficient fluid cleaning system comprising:

first means for removing solid mater from said fluid and second means for facilitating vaporizing certain liquids and/or gases in said fluid by squirting said fluid in an evaporation chamber to increase exposed surface area of said fluid in said evaporation chamber.

* * * * *